United States Patent
Taniyama et al.

(10) Patent No.: US 8,138,653 B2
(45) Date of Patent: Mar. 20, 2012

(54) ROTATING ELECTRIC MACHINE

(75) Inventors: Yoshihiro Taniyama, Tokyo (JP); Yasuo Kabata, Kanagawa (JP); Masafumi Fujita, Kanagawa (JP); Tadashi Tokumasu, Tokyo (JP); Norio Takahashi, Kanagawa (JP); Masanori Arata, Kanagawa (JP); Ken Nagakura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 85 days.

(21) Appl. No.: 12/530,531

(22) PCT Filed: Apr. 18, 2007

(86) PCT No.: PCT/JP2007/000421
§ 371 (c)(1),
(2), (4) Date: Sep. 9, 2009

(87) PCT Pub. No.: WO2008/136044
PCT Pub. Date: Nov. 13, 2008

(65) Prior Publication Data
US 2010/0084942 A1    Apr. 8, 2010

(51) Int. Cl.
*H02K 3/34* (2006.01)
(52) U.S. Cl. .................... 310/216.071; 310/216.074
(58) Field of Classification Search .............. 310/61, 310/185–187, 193, 216.069, 216.071, 216.072, 310/216.074, 216.097, 216.111
See application file for complete search history.

(56) References Cited

U.S. PATENT DOCUMENTS

| | | | | |
|---|---|---|---|---|
| 1,723,912 A | * | 8/1929 | Bergman | 310/176 |
| 3,600,618 A | * | 8/1971 | Nicholas et al. | 310/216.069 |
| 4,390,806 A | * | 6/1983 | O'Brien et al. | 310/145 |
| 4,900,964 A | * | 2/1990 | Ying et al. | 310/215 |
| 7,786,645 B2 | * | 8/2010 | Gamble et al. | 310/216.005 |
| 7,893,575 B2 | * | 2/2011 | Fujita et al. | 310/61 |

FOREIGN PATENT DOCUMENTS

| | | |
|---|---|---|
| JP | 15-016151 Y1 | 10/1940 |
| JP | 52-091104 A | 8/1977 |
| JP | 57-098151 U | 6/1982 |
| JP | 59-009741 U | 1/1984 |
| JP | 59-103582 U | 7/1984 |
| JP | 59-103584 U | 7/1984 |
| JP | 59-103585 U | 7/1984 |
| JP | 02-003172 U | 1/1990 |
| JP | 09-084312 A | 3/1997 |
| JP | 09-154246 A | 6/1997 |
| JP | 11-089132 A | 3/1999 |
| JP | 11-206045 A | 7/1999 |
| JP | 11-299143 A | 10/1999 |

* cited by examiner

*Primary Examiner* — Dang D Le
(74) *Attorney, Agent, or Firm* — Foley & Lardner LLP

(57) ABSTRACT

A rotating electric machine is provided, where a generator has an increased capacity and a reduced size achieved by electromagnetically effectively utilizing that parts of a rotor core which are outside the narrowest parts of magnetic poles of the rotor core to permit large field current and suppress an increase in temperature of rotor coils. The rotating electric machine includes a stator constructed by winding armature coils around a stator core (1), and a hollow circular cylindrical rotor. The rotor has at least one pair of magnetic poles (2), non-polar portions (3) between the magnetic poles, and interpolar portions (6) arranged in the non-polar portions. In the non-polar portions (3), a plurality of rotor slots (4) are arranged at predetermined intervals. Field windings are wound in each rotor slot (4). The cross-sectional areas (S) of the rotor slots (4) other than the rotor slots (4a) nearest to the magnetic poles (2) are gradually increased in the direction from the magnetic poles (2) to the interpolar portions (6).

9 Claims, 13 Drawing Sheets

ROTATING ELECTRIC MACHINE

TECHNICAL FIELD

The present invention relates to a rotating electric machine such as a generator and, more particularly, to a rotating electric machine having an improved shape of rotor slots.

BACKGROUND ART

A typical rotating electric machine such as a generator includes a hollow cylindrical stator constructed by winding armature coils around a stator core and a rotor having a diameter slightly smaller than the diameter of the hollow cylindrical portion of the stator and constructed by winding field coils in a layered fashion around the cylindrical rotor core. The rotor is positioned within the stator in a co-axial manner with the stator.

The stator and rotor each has a core. An armature coil and a field coil, which are each a coil of electrically conductive bars such as copper wires, are provided in each of slots formed in the cores in the axial direction of each slot. In this configuration, the rotor is rotated in a state where a DC power is supplied from an excitation power source to excite the coils on the rotor side, i.e., the field coils. This induces a voltage in the stator and thereby an electric power is generated.

In a high-speed generator such as a turbine generator, the core of the rotor is generally made from a single steel block so as to ensure mechanical strength against centrifugal force caused at the time of rotation of the rotor.

FIG. 24 is a cross-sectional view of a conventional rotating electric machine. In FIG. 24, reference numeral "1" denotes a rotor core of a rotating electric machine. The rotor core 1 has substantially a circular cross-section and is disposed within a stator core 16 around which an armature coil 15 is wound in a co-axial manner with the same. A predetermined space is interposed between the rotor core 1 and stator core 16. At least one pair of magnetic pole portions 2 and 2 between which a field flux 1 passes are formed at positions on the outer circumference of the rotor core 1 across the center point of the rotor core 1. The area other than the magnetic pole portions 2 and 2 serves as a non-polar portion 3.

A plurality of rotor slots 4 for housing not-shown field coils are formed at predetermined intervals in the non-polar portions 3. Reference numeral "5" denotes a rotor tooth portion formed between the slots 4.

The number of rotor slots 4 for each pole is an integer, so that an interpolar portion 6 is formed in the non-polar portion 3 at substantially the center of the intermediate portion between the pair of magnetic pole portions 2 and 2.

Field coils 7 are housed in the rotor slots 4, and rotor wedges 17 for coils retention are inserted on the outer diameter side of the field coils 7 so as to retain the field coils 7 against centrifugal force caused at the time of rotation of the rotor.

As shown in FIG. 25, the rotor coils 7 are electrically serially connected to one another by connecting pieces 8 at field coil end portions to constitute field coils.

The field coil end portions each includes an end ring 9, an end ring support 10, and an insulating cylinder 11 to thereby retain the field coils 7 against centrifugal force caused at the time of rotation of the rotor.

The centrifugal force applied to the rotor coils 7 housed in the rotor slots 4 shown in FIG. 24 is transmitted to the rotor tooth portions 5 via the rotor wedges 17, and the rotor coils 7 are retained therein. Thus, the widths of the rotor tooth portions 5 are designed such that the rotor tooth portions 5 have sufficient mechanical strength against the centrifugal force.

The field flux generated when the field coils are excited mainly passes through the magnetic pole portions 2 of the rotor core 1 and is supplied to a not shown stator. At this time, the magnetic flux density becomes maximum at a narrowest portions 12 of the magnetic pole portions 2 in general.

When the magnetic flux density is increased, magnetic saturation phenomenon occurs at those portions to lead to a reduction in the field flux. Thus, the narrowest portions 12 of the magnetic pole portions 2 are designed so as to have a width dimension G which prevents occurrence of large magnetic saturation.

There may be a case where cooling gas slots for introduction of cooling gas are provided on the inner diameter side of the rotor slots 4. In this case, the existence of the cooling gas slots may increase the density of the field flux $\Phi$ to give any influence on the width dimension G of the narrowest portions 12 of the magnetic pole portions 2.

Thus, the dimensions of the rotor slots 4 are restricted by the width dimension of the rotor tooth portions 5 and width dimension G of the narrowest portions 12 of the magnetic pole portions 2.

In particular, in view of the restriction imposed by the width dimension G of the narrowest portions 12 of the magnetic pole portions 2, it is often the case that, as shown in FIG. 24, the depth of a rotor slots 4a that are formed at the nearest portions to magnetic pole portions 2 are made smaller than the depth of the other rotor slots 4.

In addition, a configuration is disclosed in which disposition of the rotor slots 4 of the rotating direction leading side of the rotor is differentiated from the disposition of the rotor slots 4 of the rotating direction lagging side of the rotor (refer to, e.g., Patent Document 1). Further, a configuration is disclosed in which slits are provided to the surface of the magnetic pole portions 2 (refer to, e.g., Patent Document 2).

All the above-mentioned configurations achieve a reduction in field current under load and suppression of an increase in the temperature of the rotor.

Patent Document 1: Japanese Patent Application Laid-open Publication No. 9-84312
Patent Document 2: Japanese Patent Application Laid-open Publication No. 11-206045

DISCLOSURE OF THE INVENTION

Problems to be Solved by the Invention

The output power of a generator depends upon the magnitude of the field flux $\Phi$ passing through the magnetic pole portions 2 of the rotor core 1, so that it is necessary to increase the field flux $\Phi$ in order to increase the generator capacity, which inevitably requires an increase in a field magnetomotive force.

In order to increase the field magnetomotive force, the field current needs to be increased. The increase in the field current increases the current density in the field coil, resulting in an increase in coil temperature.

However, the rotor coil temperature is strictly restricted by the upper temperature limit of an insulating member used as a coil insulator. Thus, in the case where a temperature rise occurs in one region of the rotor coil, it is necessary to restrict the field current so as to limit the heating value even if the coil temperature of the other region is sufficiently lower than the upper temperature limit, making it impossible to increase the output power of the rotating electric machine.

Further, when coil temperature differs among a plurality of rotor coils, a shaft vibration due to heat expansion imbalance among the rotor coils, causing the generator to malfunction, which reduces reliability.

Meanwhile, the upper limit of the field flux Φ is restricted by the width dimension G of the narrowest portions 12 of the magnetic pole portions 2 of the rotor core 1, so that it can be said that a part of the rotor core that is outside the width dimension G of the narrowest portions 12 is not effectively utilized.

The present invention has been made in view of the above points, and an object thereof is to provide a rotating electric machine, as a generator having an increased capacity and a reduced size, capable of allowing large field current and suppressing an increase in temperature of a rotor coil by electromagnetically effectively utilizing a part of a rotor core that is outside the narrowest portions of the magnetic pole portions of the rotor core.

Means for Solving the Problem

In order to achieve the object, according to the present invention stipulated in claim 1, there is provided a rotating electric machine comprising: a stator constructed by winding armature coils around a stator core; and a cylindrical rotor having at least one pair of magnet pole portions and interpolar portions formed in non-polar portions between the magnetic pole portions, each of the non-polar portions having at least three rotor slots formed with predetermined intervals, and each of the rotor slots housing a field coil, characterized in that the cross-sectional areas of the rotor slots other than rotor slots formed at the positions nearest to the magnetic pole portions are gradually increased in the direction from the magnetic pole portions toward the interpolar portions.

Advantages of the Invention

According to the present invention, there can be provided a rotating electric machine, as a generator having an increased capacity and a reduced size, capable of allowing large field current and suppressing an increase in temperature of a field coil by electromagnetically effectively utilizing a part of a rotor core that is outside the narrowest portions of the magnetic pole portions of the rotor core.

EXPLANATION OF REFERENCE SYMBOLS

Figure 1:
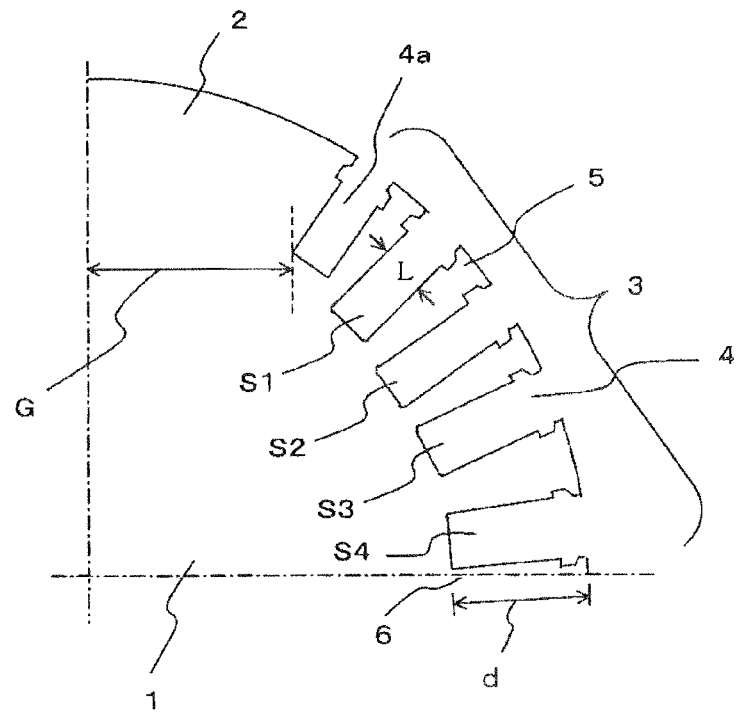
FIG. 1 is a front quarter view of a rotor of a rotating electric machine according to a first embodiment of the present invention.

1: Rotor core
2: Magnetic pole portion
3: Non-polar portion
4: Rotor slot
5: Rotor tooth portion
6: Interpolar portion
7: Rotor coil
8: Connecting piece 9: End ring
10: End ring support
11: Insulating cylinder
12: Narrowest portion of magnetic pole portion
13, 14: Cooling gas duct
15: Armature coil
16: Stator core
17: Rotor wedge
G: Width of narrowest portion of magnetic pole portion
L: Width of rotor slot
d: Depth of rotor slot
S: Cross-section area of rotor slot
α: Slot interval angle

BEST MODE FOR CARRYING OUT THE INVENTION

Embodiments of the present invention will be described below with reference to the accompanying drawings.

Figure 24:
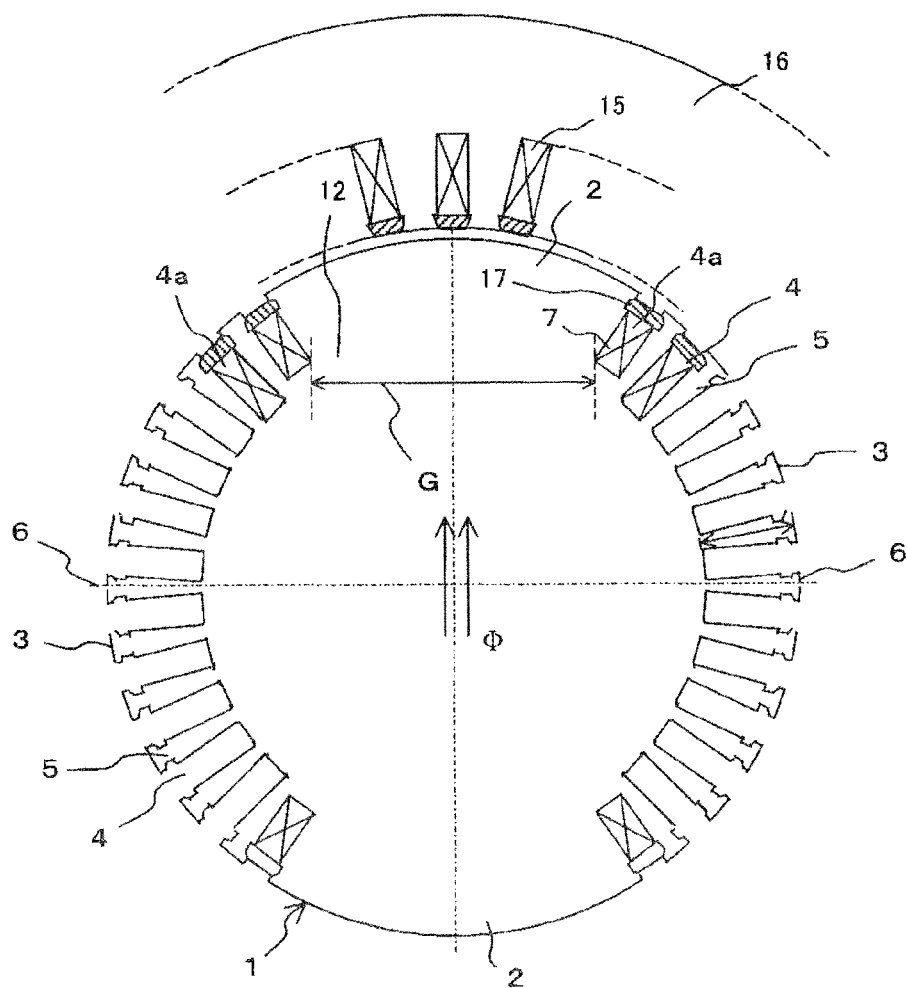
FIG. 24 is a cross-sectional view of a conventional rotating electric machine.
Figure 25:
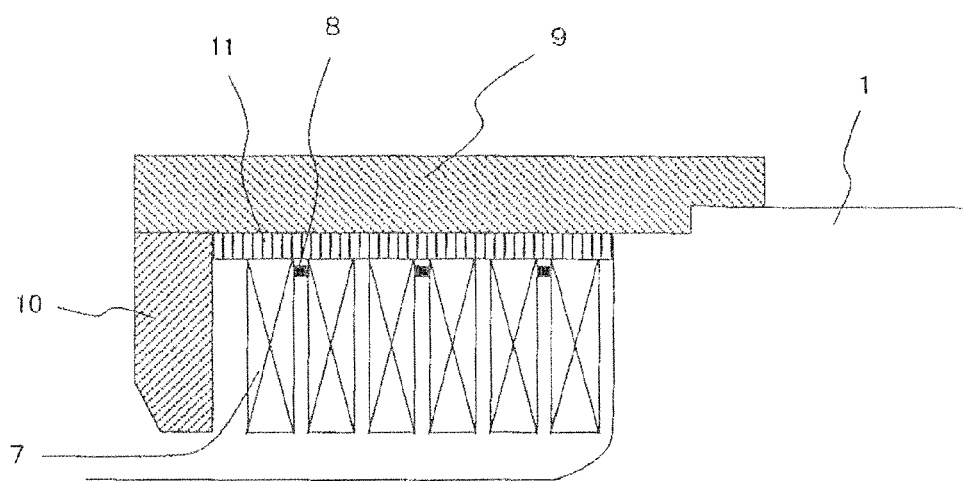
FIG. 25 is a cross-sectional view showing a configuration of a field coil at the end ring portion of a rotor of the conventional rotating electric machine.

The same reference numerals as those in the components of the conventional rotating eclectic machine shown in FIGS. 24 and 25 are given to the same or corresponding components in a rotating electric machine according to the present invention, and the detailed descriptions thereof will be omitted in the following description.

First Embodiment

FIGS. 1 to 7 show a rotor of a rotting eclectic machine according to the first embodiment of the present invention, in which the illustration of a stator is omitted. In FIG. 1, reference numeral "1" denotes a rotor core (¼ part) of the rotating electric machine. Reference numeral "2" denotes a magnetic pole portion, numeral 3 denotes a non-polar portion, numeral "4" denotes a rotor slot formed in the non-polar portion 3, numeral "5" denotes a rotor tooth portion, and numeral "6" denotes an interpolar portion.

The rotor core 1 of the rotating electric machine according to the present embodiment has a plurality of rotor slots 4 for housing not shown rotor coils, which are formed by cutting the rotor core 1 from the outer diameter side thereof to the inner diameter side. The cross-sectional areas S1, S2, S3 and S4 of the plurality of rotor slots 4 other than rotor slots 4a formed at the position nearest to the magnetic pole portions 2 are stepwise increased (S1<S2<S3<S4) in the direction from the magnetic pole portions 2 toward the interpolar portions 6.

As a configuration in which the total slot cross-sectional area S is increased, there is one as shown in FIG. 1. That is, the widths L of the rotor slots 4 are gradually increased in the direction from the magnetic pole portions 2 toward the interpolar portions 6 in a range within which the stress of the rotor tooth portions 5 is maintained with the depths d of the rotor slots 4 set to a constant value. In this case, the increase need not be stepwise.

Figure 2:
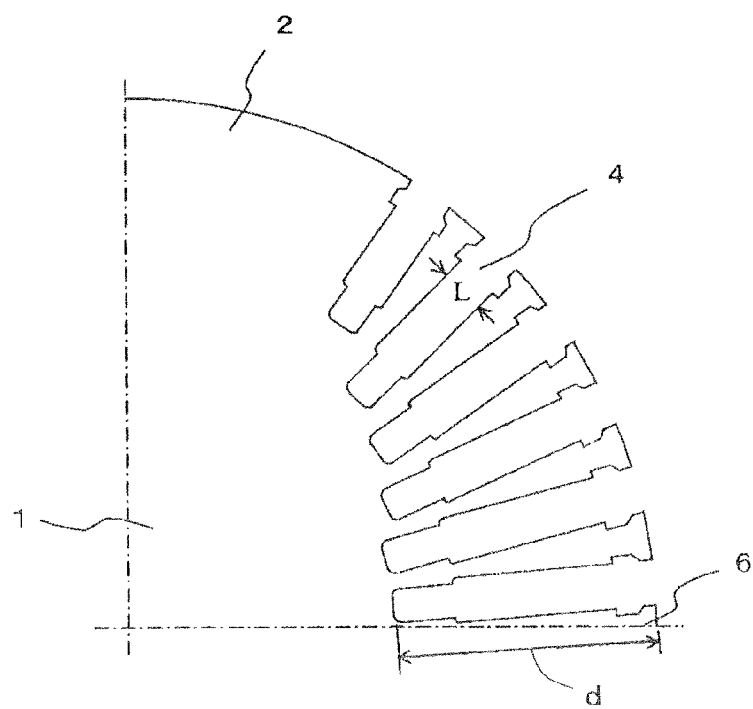
FIG. 2 is a front quarter view showing a first modification of the rotor of the rotating electric machine according to the first embodiment of the present invention.

Alternatively, as shown in FIG. 2, the depths d of the rotor slots 4 may gradually be increased in the direction from the magnetic pole portions 2 toward the interpolar portions 6 in a range within which the stress of the rotor tooth portions 5 is maintained with the widths L of the rotor slots 4 set to a constant value.

Figure 3:
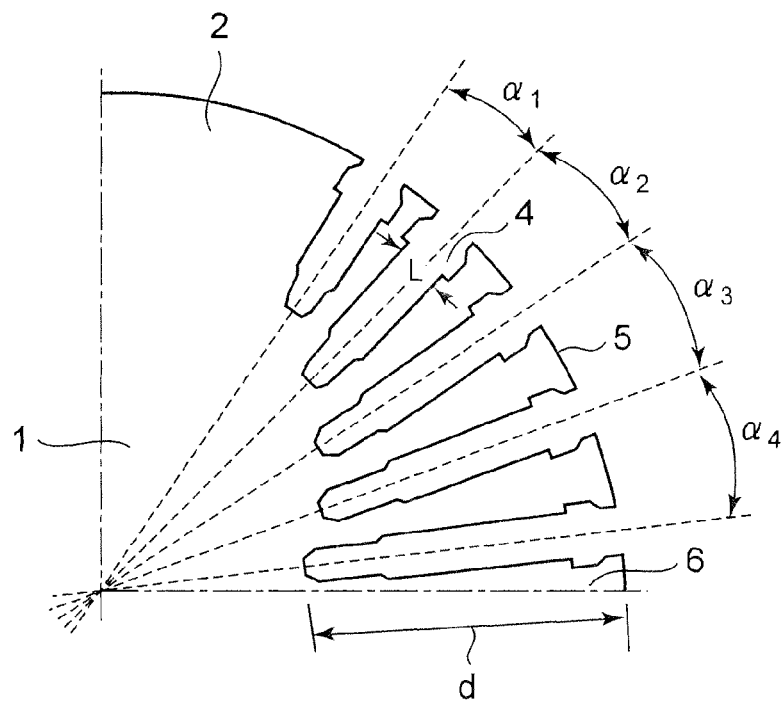
FIG. 3 is a front quarter view showing a second modification of the rotor of the rotating electric machine according to the first embodiment of the present invention.
Figure 4:
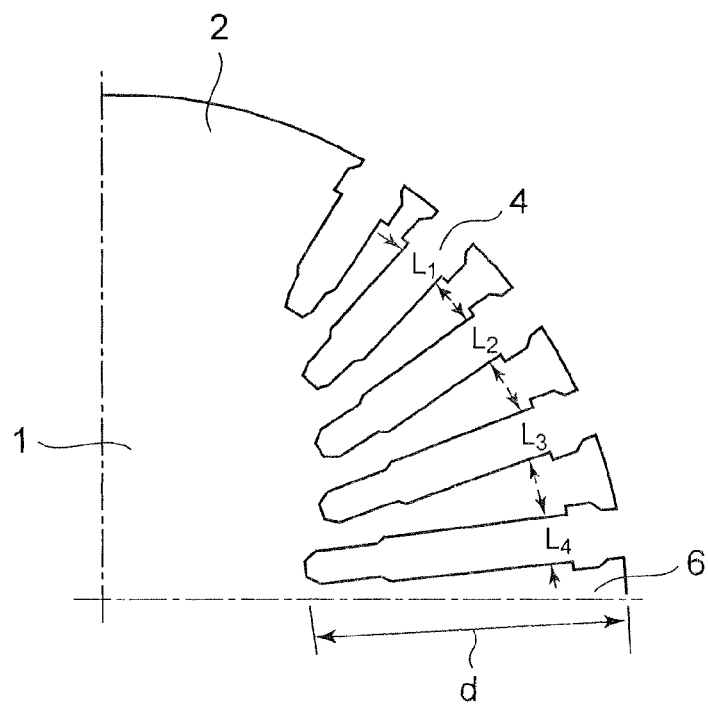
FIG. 4 is a front quarter view showing a third modification of the rotor of the rotating electric machine according to the first embodiment of the present invention.
Figure 5:
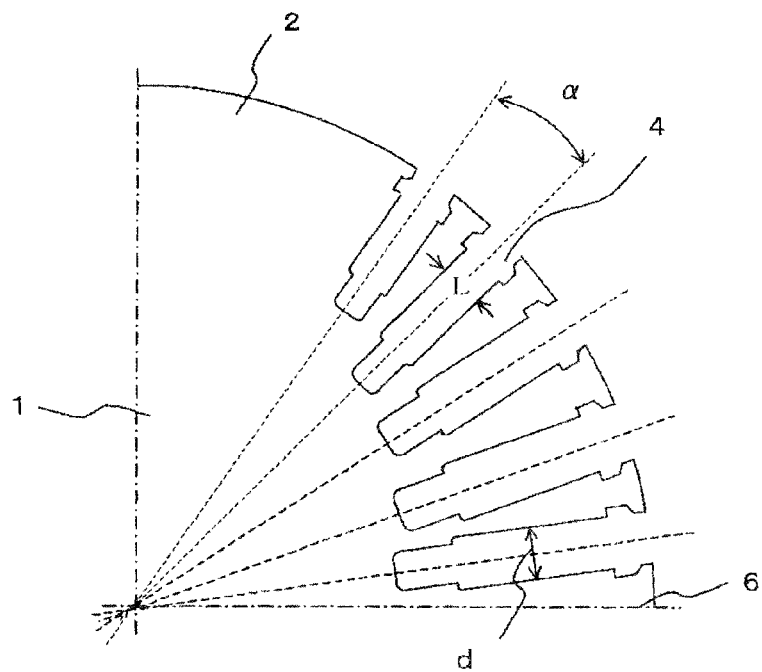
FIG. 5 is a front quarter view showing a fourth modification of the rotor of the rotating electric machine according to the first embodiment of the present invention.

Alternatively, as shown in FIG. 3, a configuration may be adopted in which, with the widths L of the rotor slots 4 set to a constant value, the slot interval angles α (interval angles between the slots) between adjacent slots are stepwise increased in the direction from the magnet pole portions 2 toward the interpolar portions 6 such that $\alpha_1<\alpha_2<\alpha_3<\alpha_4$ is established and, at the same time, the depths d of the rotor slots 4 are stepwise increased in the direction from the magnetic pole portions 2 toward the interpolar portions 6 in a range within which the stress of the rotor tooth portions 5 is maintained. Alternatively, as shown in FIG. 4, a configuration may be adopted in which the depths d of the rotor slots 4 are stepwise increased in the direction from the magnetic pole portions 2 toward the interpolar portions 6 and, at the same time, the widths L of the rotor slots 4 are stepwise increased in the direction from the magnetic pole portions 2 toward the interpolar portions 6 such that $L_1<L_2<L_3<L_4$ is established in a range within which the stress of the rotor tooth portions 5 is maintained. Alternatively, as shown in FIG. 5, a configuration may be adopted in which the slot interval angles α of the rotor slots 4 are stepwise increased in the direction from the magnetic pole portions 2 toward the interpolar portions 6 and, at the same time, the widths L of the rotor slots 4 are stepwise increased in the direction from the magnetic pole portions 2 toward the interpolar portions 6 in a range within which the stress of the rotor tooth portions 5 is maintained.

Figure 6:
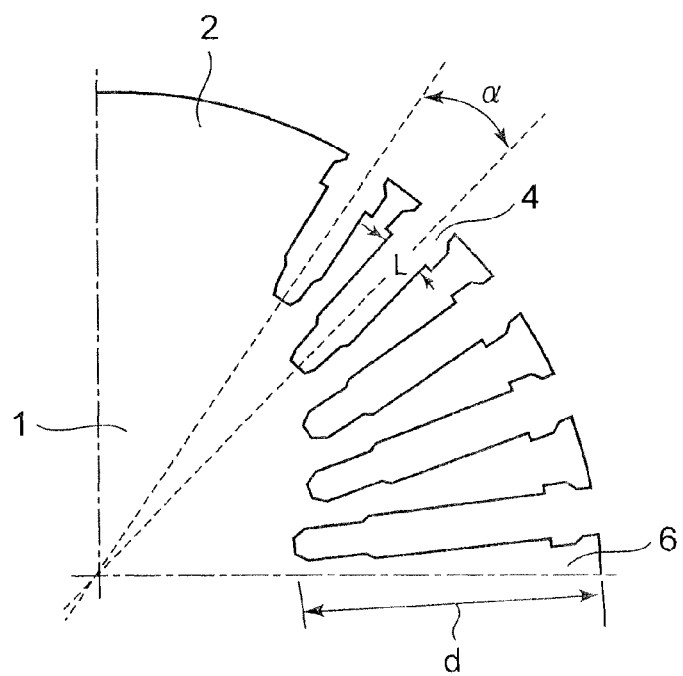
FIG. 6 is a front quarter view showing a fifth modification of the rotor of the rotating electric machine according to the first embodiment of the present invention.

Alternatively, as shown in FIG. 6, a configuration may be adopted in which the slot interval angles α of the rotor slots 4 are stepwise increased in the direction from the magnetic pole portions 2 toward the interpolar portions 6 and, at the same time, the widths L and depths d of the rotor slots 4 are controlled in a range within which the stress of the rotor tooth portions 5 is maintained so as to increase the total cross-sectional area S of the rotor slots 4.

Figure 7:
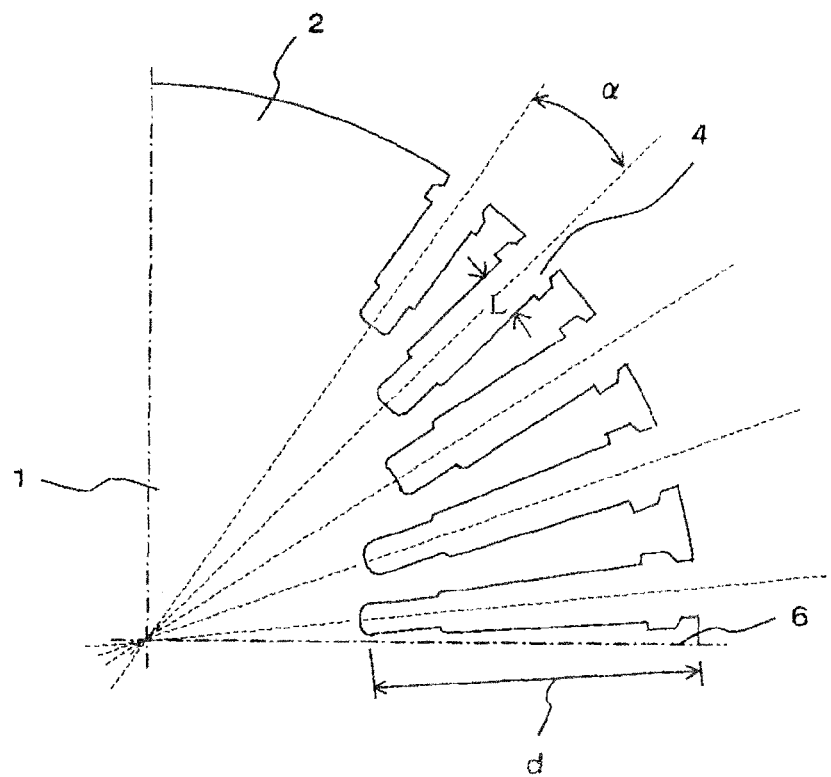
FIG. 7 is a front quarter view showing a sixth modification of the rotor of the rotating electric machine according to the first embodiment of the present invention.

Further, as shown in FIG. 7, the width L of the rotor slots 4 may be tapered toward the rotor inner diameter side.

As described above, the cross-sectional areas S1, S2, S3, and S4 of the plurality of rotor slots 4 formed in the rotor core 1 other than the rotor slots 4a formed at the position nearest to the magnetic pole portions 2 are stepwise increased (S1<S2<S3<S4) in the direction from the magnetic pole portions 2 toward the interpolar portions 6. This allows the absolute amount of windings of the field coils housed in the rotor slots 4 to be increased, resulting in an increase in the cross-sectional area to which the field current is applied.

Further, by stepwise increasing the depths d of the rotor slots 4, widths L of the rotor slots 4, or slot interval angles α in the direction from the magnetic pole portions 2 toward the interpolar portions 6, it is possible to ensure a larger total slot cross-sectional area S without influencing the width G of the narrowest portion of the magnetic pole portions 2.

Further, by tapering the width L of the rotor slots 4 toward the rotor inner diameter side, it is possible to ensure a larger minimum width of the rotor tooth portions 5 at the rotor core inner diameter side.

The increase in the total cross-sectional area of the rotor slots 4 formed in the rotor core 1 accordingly increases the cross-sectional area of the field coils to which the field current is applied. As a result, the field current density can be reduced in the rotor slots 4 in which the cross-sectional area to which the field current is applied is increased.

Accordingly, the heat generation density of the field coil to be energized is reduced, which is advantageous in terms of coil cooling as compared to another rotor configuration having the same outer diameter.

As a result, it is possible to achieve an increase in the generator output power by increasing the field current or a reduction in the size of the generator.

Further, draft loss can be reduced by a reduction in the amount of cooling air, thereby contributing to an improvement in the generator efficiency.

Further, by stepwise increasing the cross-sectional areas of the rotor slots 4 in the direction from the magnetic pole portions 2 toward the interpolar portions 6, it is possible to suppress an increase in the temperature of the rotor coils 7 arranged on the interpolar portion sides where the length of the field coils are large, suppressing the amount of heat expansion of the field coils. As a result, it is possible to provide a safer generator.

In addition, by tapering the width L of the rotor slots 4 such that the cross-sectional areas S of the rotor slots 4 are made smaller toward the core inner diameter side, it is possible to give a margin to the mechanical strength against the rotational centrifugal force, making it easy to increase the cross-sectional areas S of the rotor slots 4, which further increases the above-mentioned effects.

Meanwhile, to increase the number of turns of the field coils with the increase of the total cross-sectional area S of the rotor slots 4 is effective. This allows a reduction in the field current while keeping the ampere-turn constant, making it possible to obtain the above-mentioned effects.

Figure 8:
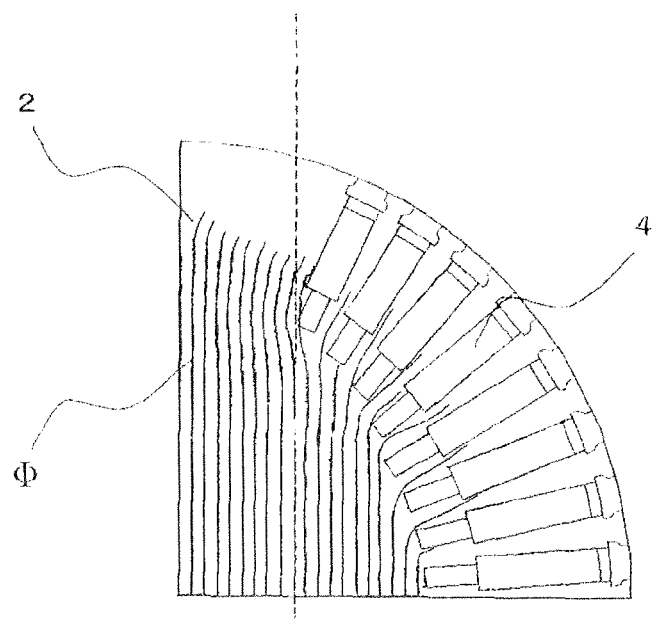
FIG. 8 is a view showing an example of an analysis result of field flux distribution in a rotor coil cross-section of the rotating electric machine according to the present invention.

Distribution of the field flux Φ according to the present embodiment is shown in FIG. 8. As shown in FIG. 8, the influence of the field flux is small, so that it is possible to effectively utilize the part of the rotor core that is outside the narrowest width dimension G portion.

Second Embodiment

A second embodiment of the present invention will be described below with reference to FIGS. 9 to 12.

Figure 9:
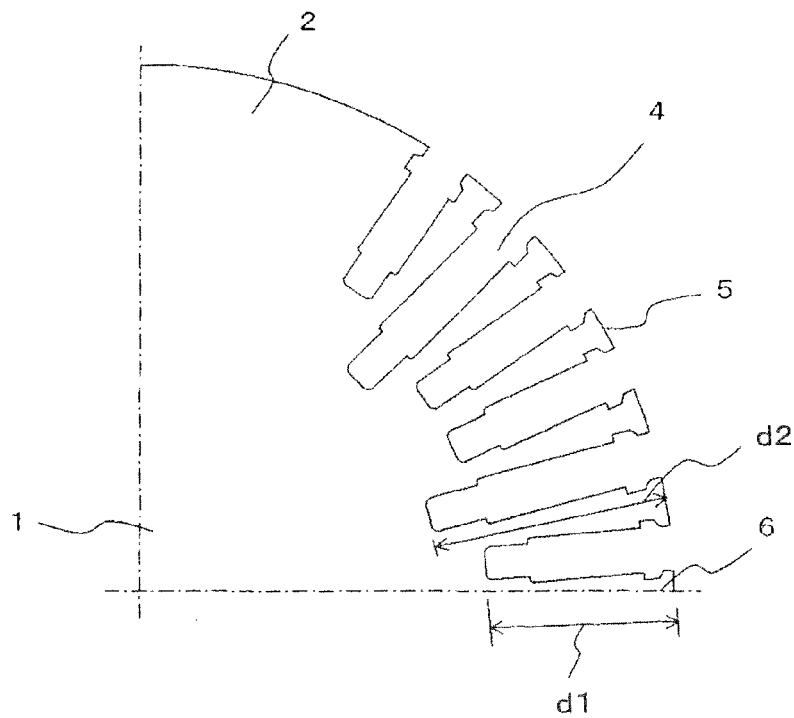
FIG. 9 is a front quarter view of a rotor of a rotating electric machine according to a second embodiment of the present invention.

FIG. 9 shows the shape of the rotor core 1 of a rotating electric machine according to the second embodiment of the present invention. The rotor core 1 according to the present embodiment has a plurality of rotor slots 4 for housing rotor coils, which are formed by cutting the rotor core 1 from the outer diameter side thereof to the inner diameter side, the depth d of the rotor slots 4 being varied (at two values of d1 and d2).

The width of the rotor tooth portions 5 are designed such that the rotor tooth portions 5 have sufficient mechanical strength against the centrifugal force to be applied to the field coils.

Figure 10:
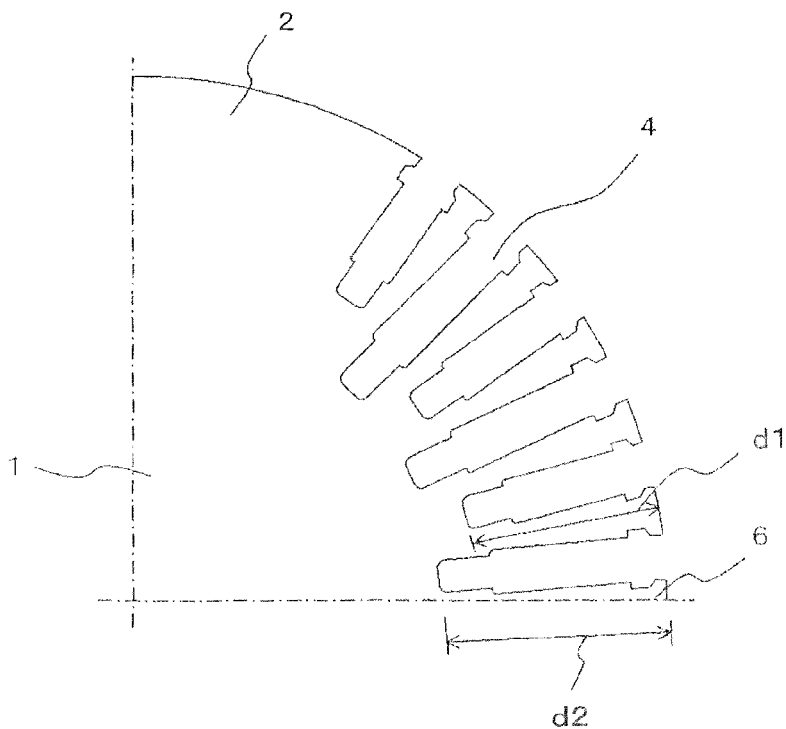
FIG. 10 is a front quarter view showing a first modification of the rotor of the rotating electric machine according to the second embodiment of the present invention.

As another configuration in which the depth d of the rotor slots 4 is varied, there is one in which the smaller depths (d1) and larger depths (d2) alternately appear, as shown in FIG. 10.

Figure 11:
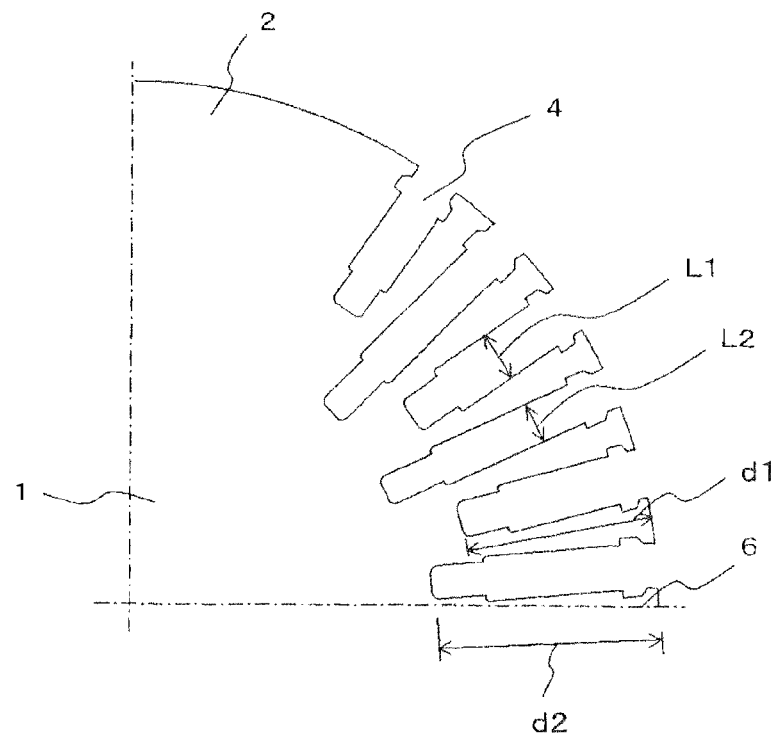
FIG. 11 is a front quarter view showing a second modification of the rotor of the rotating electric machine according to the second embodiment of the present invention.

Alternatively, as shown in FIG. 11, it is effective that the width L1 of the rotor slots 4 having the smaller depth (d1) is made larger than the width L2 of the rotor slots 4 having the larger depth (d2).

Figure 12:
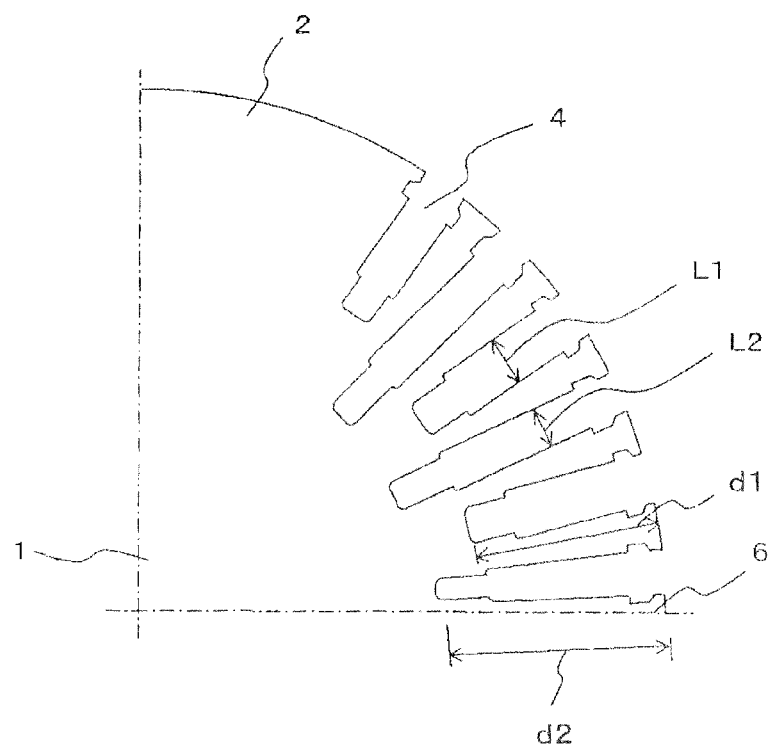
FIG. 12 is a front quarter view showing a third modification of the rotor of the rotating electric machine according to the second embodiment of the present invention.

Further, as shown in FIG. 12, the width L of the rotor slots 4 may be tapered toward the rotor inner diameter side.

As described above, by varying the depth of the rotor slots 4 formed in the rotor core 1, it is possible to increase the absolute amount of windings of the field coils housed in the rotor slots 4 having the larger depth d, so that there can be expected an increase in the cross-sectional area to which the field current is applied.

Further, by adopting the configuration in which the smaller depths (d1) and larger depths (d2) alternately appear, it is possible to ensure a larger total slot cross-sectional area without influencing the width G of the narrowest portions of the magnetic pole portions.

Further, by tapering the width L of the rotor slots toward the rotor inner diameter side, it is possible to ensure a larger minimum width of the rotor tooth portions 5 at the rotor core inner diameter side.

Thus, by varying the depth of the rotor slots 4 formed in the rotor core 1, it is possible to increase the cross-sectional area to which the field current is applied in the rotor slots having the larger depth d. As a result, the field current density can be reduced in the rotor slots.

Accordingly, the heat generation density of the field coils to be energized is reduced, which is advantageous in terms of coil cooling as compared to another rotor configuration having the same outer diameter.

As a result, it is possible to achieve an increase in the generator output power by increasing the field current or a reduction in the size of the generator.

Further, draft loss can be reduced by a reduction in the amount of cooling air, thereby contributing to an improvement in the generator efficiency.

Further, adoption of the configuration in which the smaller depths (d1) and larger depths (d2) alternately appear increases the total cross-sectional area S of the rotor slots 4 most effectively.

In addition, by tapering the width L of the rotor slots 4 such that the cross-sectional area S of the rotor slots 4 is made smaller toward the core inner diameter side, it is possible to give a margin to the mechanical strength against the rotational centrifugal force, making it easy to increase the total cross-sectional area S of the rotor slots 4, which further increases the above-mentioned effects.

To increase the number of turns of the field coils with the increase of the cross-sectional areas S of the rotor slots 4 is also effective. This allows a reduction in the field current while keeping the ampere-turn constant, making it possible to obtain the above-mentioned effects.

Third Embodiment

A third embodiment of the present invention will be described below with reference to FIGS. 13 to 18.

Figure 13:
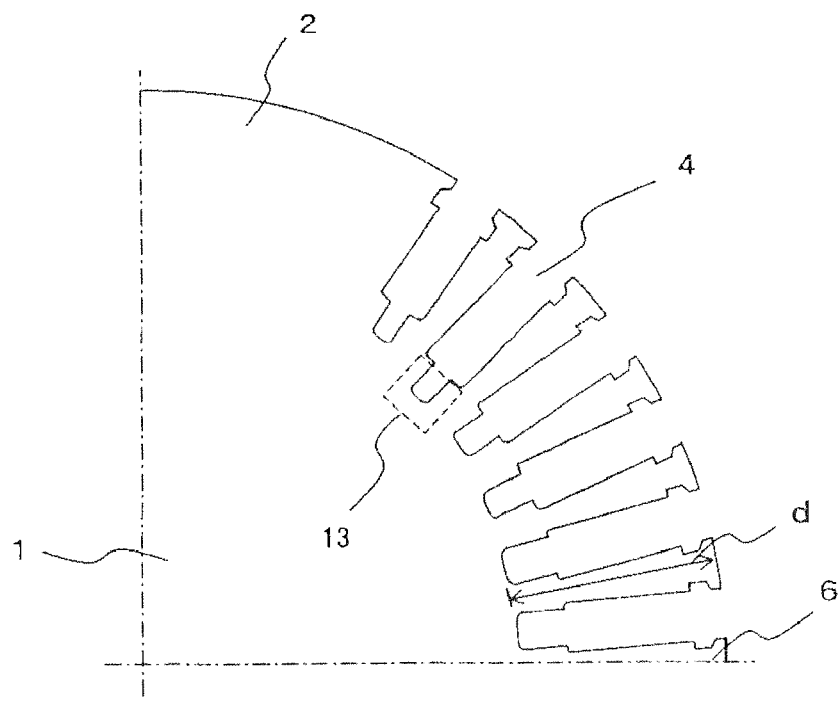
FIG. 13 is a front quarter view of a rotor of a rotating electric machine according to a third embodiment of the present invention.

FIG. 13 shows the shape of the rotor core 1 of a rotating electric machine according to a third embodiment of the present invention. The rotor core 1 according to the present embodiment has a plurality of rotor slots 4 for housing rotor coils, which are formed by cutting the rotor core 1 from the outer diameter side thereof to the inner diameter side, and cooling gas ducts 13 for supplying cooling gas to the rotor coils are formed at the inner diameter side of each of the rotor slots 4. The cross-sectional areas of the cooling gas ducts 13 are stepwise increased in the direction from the magnetic pole portions 2 toward the non-polar portions 6.

Although the increase in the cross-sectional areas S of the rotor slots 4 need not be stepwise, the width of the rotor tooth portions 5 is designed such that the rotor tooth portions 5 have sufficient mechanical strength against the centrifugal force to be applied to the field coils.

Figure 14:
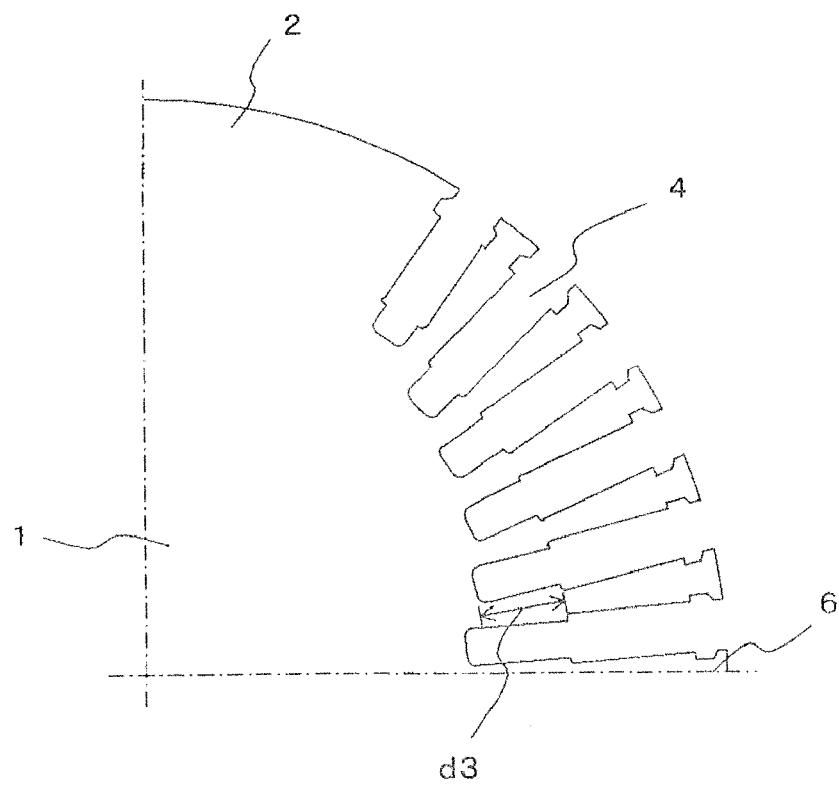
FIG. 14 is a front quarter view showing a first modification of the rotor of the rotating electric machine according to the third embodiment of the present invention.

As a configuration in which the cross-sectional areas S of the cooling gas ducts 13 of the rotor slots 4 are stepwise increased, there is one in which the depths d3 of the cooling gas ducts 13 are stepwise increased in the direction from the magnetic pole portions 2 toward the interpolar portions 6, as shown in FIG. 14.

Figure 15:
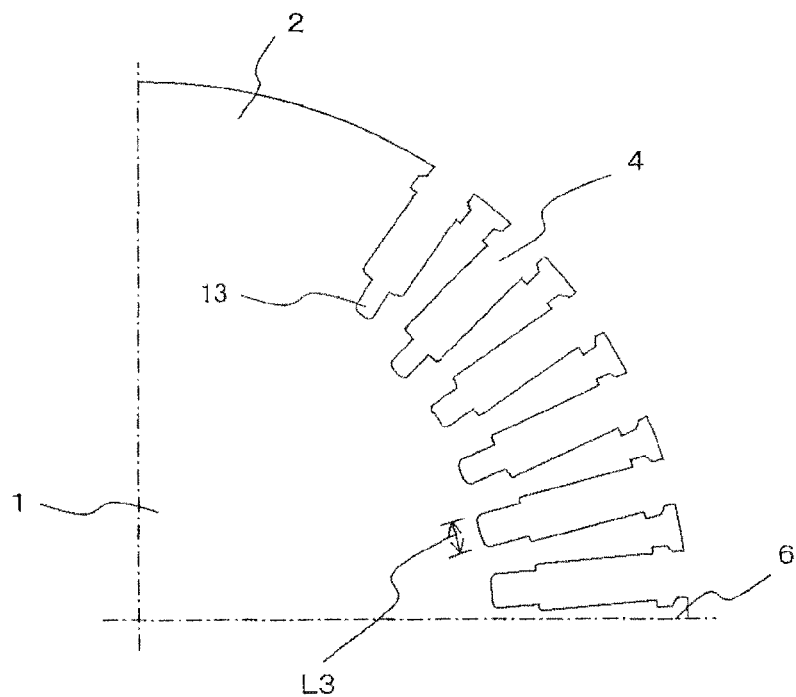
FIG. 15 is a front quarter view showing a second modification of the rotor of the rotating electric machine according to the third embodiment of the present invention.

Alternatively, as shown in FIG. 15, the slot widths L3 of the cooling gas ducts 13 may be stepwise increased in the direction from the magnetic pole portions 2 toward the interpolar portions 6.

Figure 16:
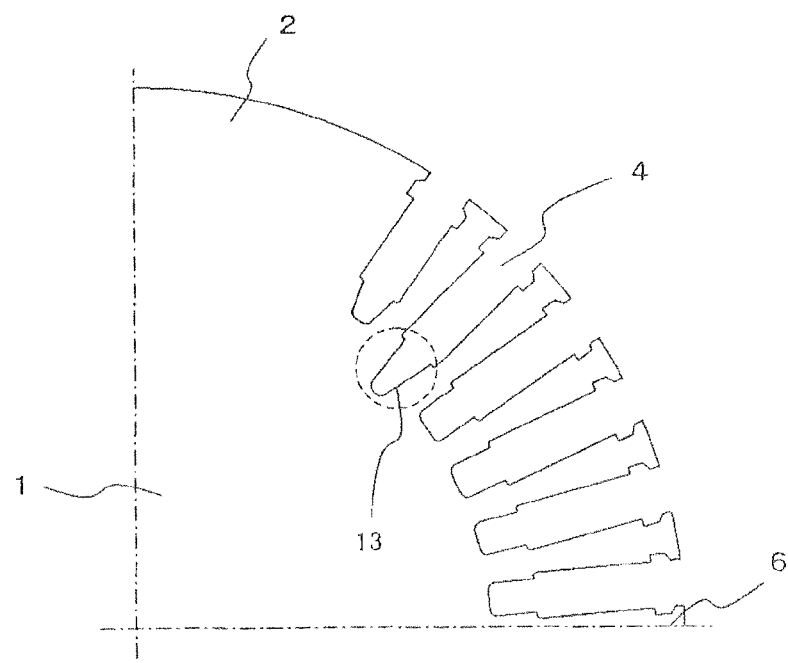
FIG. 16 is a front quarter view showing a third modification of the rotor of the rotating electric machine according to the third embodiment of the present invention.

Further, as shown in FIG. 16, the width of the cooling gas ducts 13 may be tapered toward the rotor inner diameter side.

Figure 17:
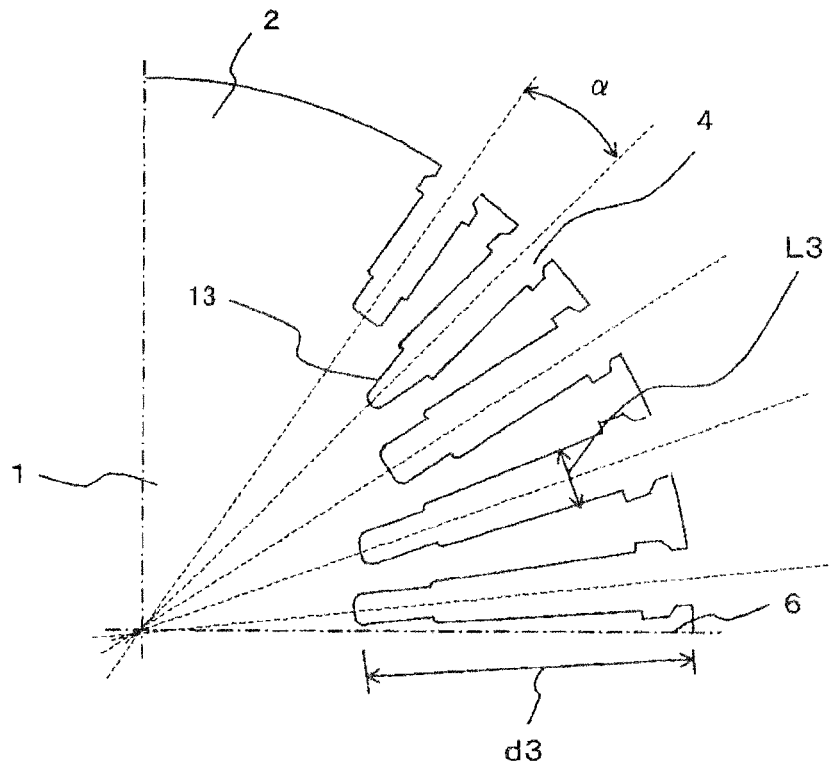
FIG. 17 is a front quarter view showing a fourth modification of the rotor of the rotating electric machine according to the third embodiment of the present invention.
Figure 18:
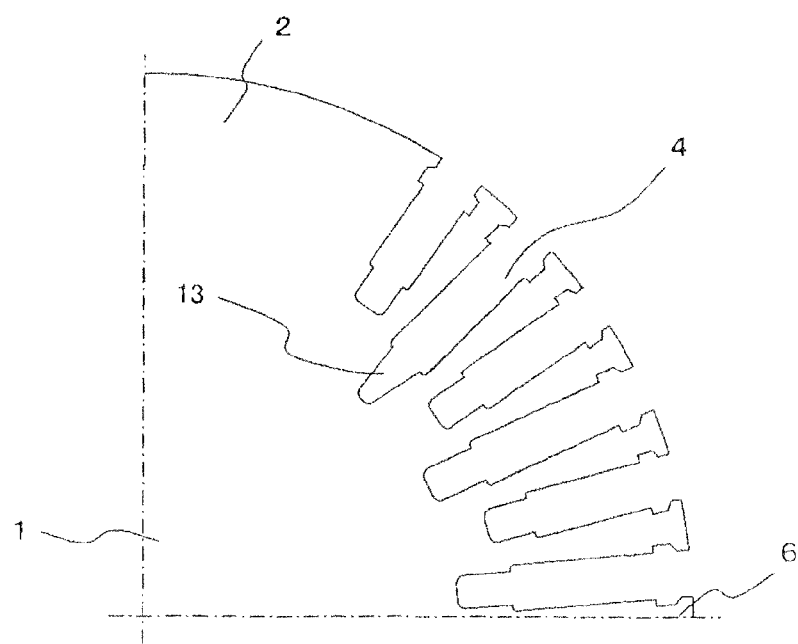
FIG. 18 is a front quarter view showing a fifth modification of the rotor of the rotating electric machine according to the third embodiment of the present invention.

Further, as shown in FIGS. 17 and 18, it is effective that the total cross-sectional area of the cooling gas ducts 13 is increased in the configuration combined with the features of the first and/or second embodiments.

As described above, by increasing the total cross-sectional area of the cooling gas ducts 13 formed at the inner diameter side of the rotor slots 4 of the rotor core 1, it is possible to expect that supply of cooling gas can be made easier.

Further, by stepwise increasing the depths d3 or slot widths L3 of the cooling gas ducts 13 in the direction from the magnetic pole portions 2 toward the interpolar portions 6, it is possible to ensure a larger total cross-sectional area of the cooling gas ducts 13 without influencing the width G of the narrowest portions of the magnetic pole portions 2.

Further, by tapering the slot width L3 of the rotor slots 4 toward the rotor inner diameter side, it is possible to ensure a larger minimum width of the rotor tooth portions 5 at the rotor core inner diameter side.

Further, by combining the configuration of the present embodiment with the features of the first and/or second embodiments, it is possible to achieve rotor coil cooling more easily.

As described above, it is possible to increase the total cross-sectional area of the cooling gas ducts 13 formed at the rotor slot inner diameter side of the rotor core 1. This reduces draft loss including entrance loss at a cooling gas duct formed in the rotor edge surface or friction loss caused when the cooling gas passes through the inside of the rotor, making it possible to cool the rotor coil with less fan power.

The reduction of draft loss contributes to an improvement in the generator efficiency.

Further, by forming the cooling gas ducts 13 at the inner diameter side, it is possible to increase self-fanning effect produced by the rotation, thereby enhancing cooling performance. As a result, it is possible to achieve an increase in the generator output power or a reduction in the size of the generator.

Further, by combining the configuration of the present embodiment with the features of the first and/or second embodiments, it is possible to independently obtain the effects of the reduction in the heat generation density of the field coils and enhancement of the rotor coil cooling performance, thereby contributing to an increase in the generator output power, reduction in the size of the generator, and improvement in the generator efficiency.

Fourth Embodiment

A fourth embodiment of the present invention will be described below with reference to FIGS. 19 to 23.

Figure 19:
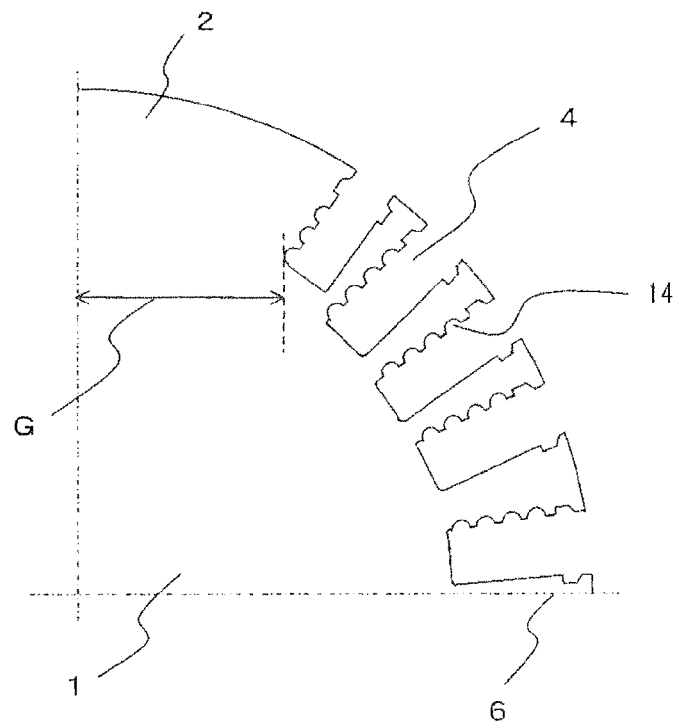
FIG. 19 is a front quarter view of a rotor of a rotating electric machine according to a fourth embodiment of the present invention.

FIG. 19 shows the shape of the rotor core 1 of a rotating electric machine according to a fourth embodiment of the present invention. The rotor core 1 according to the present embodiment has a plurality of rotor slots 4 for housing rotor coils, which are formed by cutting the rotor core 1 from the outer diameter side thereof to the inner diameter side, and a cooling gas ducts 14 for supplying cooling gas to the rotor coils are formed at the side surface of each of the rotor slots 4 (rotor tooth portions 5).

Figure 20:
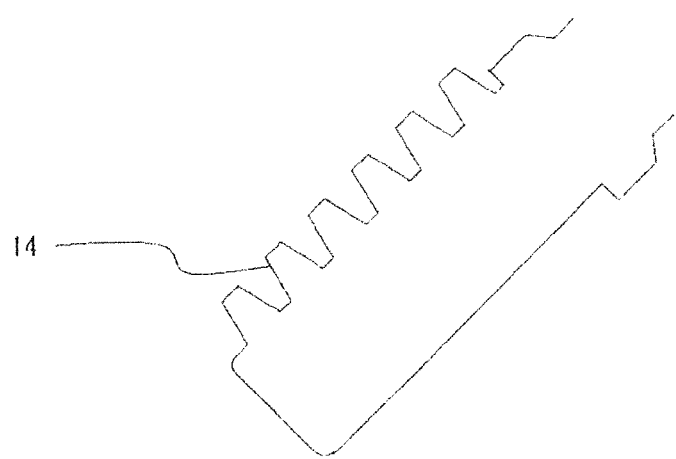
FIG. 20 is a front quarter view showing a first modification of the rotor of the rotating electric machine according to the fourth embodiment of the present invention.

The shape of the cooling gas ducts 14 is not limited to those shown in FIG. 19 but the cooling gas ducts 14 may have any shape, such as trapezoid shape as shown in FIG. 20, as long as the rotor coils housed are not displaced from a proper position during generator operation.

The width of the rotor tooth portions 5 is designed such that the rotor tooth portions 5 have sufficient mechanical strength against the centrifugal force to be applied to the field coils.

Figure 21:
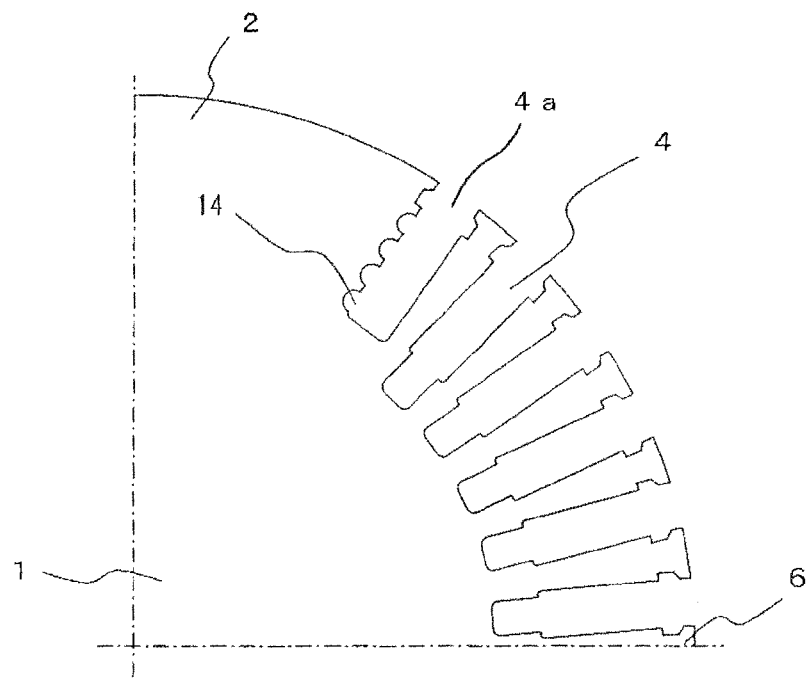
FIG. 21 is a front quarter view showing a second modification of the rotor of the rotating electric machine according to the fourth embodiment of the present invention.

The cooling gas ducts 14 may be most effectively formed at the side surface of each of the slots 4a nearest to the magnetic pole portions 2 as shown in FIG. 21.

Figure 22:
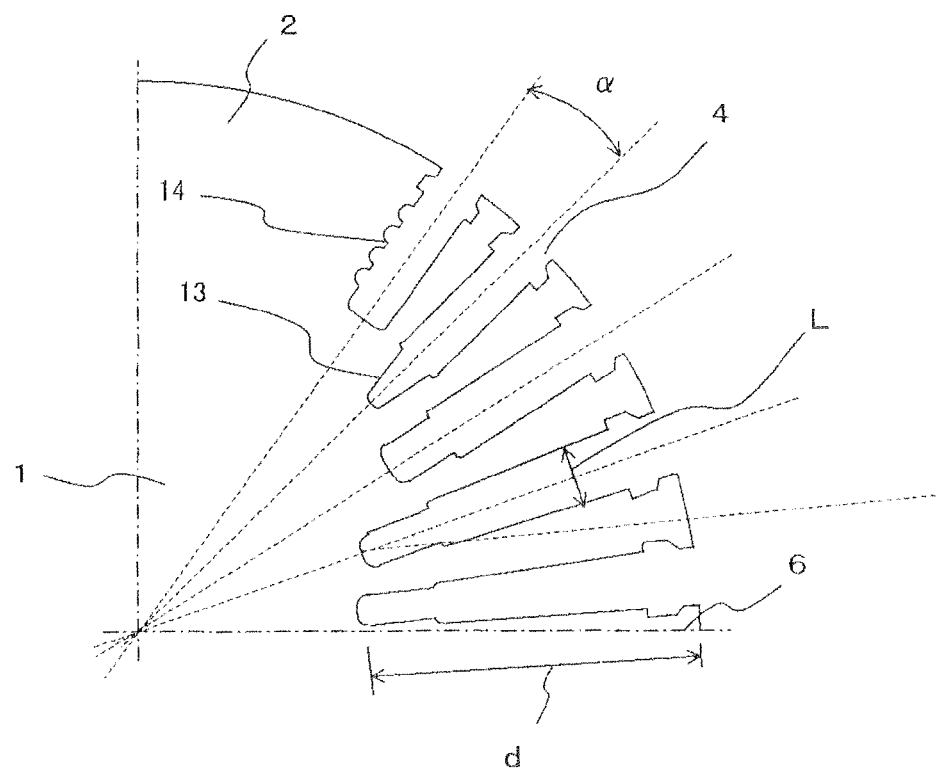
FIG. 22 is a front quarter view showing a third modification of the rotor of the rotating electric machine according to the fourth embodiment of the present invention.
Figure 23:
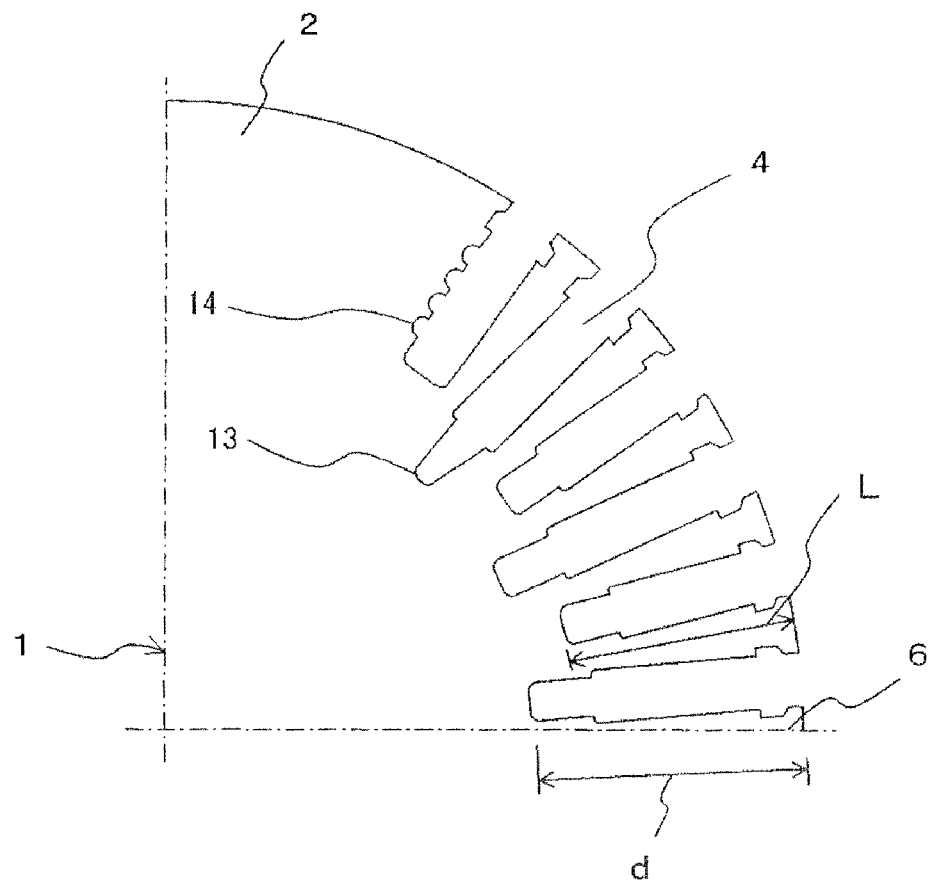
FIG. 23 is a front quarter view showing a fourth modification of the rotor of the rotating electric machine according to the fourth embodiment of the present invention.

Further, as shown in FIGS. 22 and 23, it is effective that the cooling gas ducts 13 and 14 are simultaneously formed in the configuration combined with the features of the first and/or second embodiments.

As described above, by forming the cooling gas ducts 14 for supplying cooling gas to the rotor coils 7 at the side surface of each of the rotor slots 4, it is possible to increase the allowable range of the slot depth d of the rotor slots 4. Further, it is possible to ensure a larger total cross-sectional area of the rotor slots 4 without influencing the width G of the narrowest portions of the magnetic pole portions 2.

Further, by combining the configuration of the present embodiment with the features of the first and/or second embodiments, a further increase in the total cross-sectional area of the rotor slots can be expected.

Thus, by forming the cooling gas ducts 14 for supplying cooling gas to the rotor coils 7 at the side surface of each of the rotor slots 4, it is possible to increase the slot depth d of the rotor slots 4 formed in the rotor core 1 to thereby increase the total cross-sectional area S of the rotor slots 4.

This increases the cross-sectional area to which the field current is applied, so that the field current density can be reduced in the rotor slots in which the cross-sectional area to which the field current is applied is increased.

Accordingly, the heat generation density of the field coil to be energized is reduced, which is advantageous in terms of coil cooling as compared to another rotor configuration having the same outer diameter.

As a result, it is possible to achieve an increase in the generator output power by increasing the field current or a reduction in the size of the generator.

Further, draft loss can be reduced by a reduction in the amount of cooling air, thereby contributing to an improvement in the generator efficiency.

Meanwhile, to increase the number of turns of the field coil with the increase of the total cross-sectional area S of the rotor slots 4 is effective. This allows a reduction in the field current while keeping the ampere-turn constant, making it possible to obtain the above-mentioned effects.

Further, by combining the configuration of the present embodiment with the features of the first and/or second embodiments, a further increase in the total cross-sectional area of the rotor slots can be expected.

The invention claimed is:

1. A rotating electric machine comprising:
    a stator constructed by winding armature coils around a stator core; and
    a cylindrical rotor having at least one pair of magnet pole portions and interpolar portions formed in non-polar portions between the magnetic pole portions, each of the non polar portions having at least three rotor slots formed with predetermined intervals, and each of the rotor slots housing a field coil, wherein:
    the cross-sectional areas of the rotor slots other than rotor slots formed at the positions nearest to the magnetic pole portions are gradually increased in the direction from the magnetic pole portions toward the interpolar portions, and
    the interval between adjacent rotor slots is increased in the direction from the magnetic pole portions toward the interpolar portions, and depths of the rotor slots are gradually increased in the direction from the magnetic pole portions toward the interpolar portions.

2. The rotating electric machine according to claim 1, wherein a cooling gas duct is formed at the inner diameter side of each of the rotor slots of the rotor core.

3. The rotating electric machine according to claim 1, wherein cooling gas ducts are formed at side surface of the rotor slots.

4. A rotating electric machine comprising:
- a stator constructed by winding armature coils around a stator core; and
- a cylindrical rotor having at least one pair of magnet pole portions and interpolar portions formed in non-polar portions between the magnetic pole portions, each of the non polar portions having at least three rotor slots formed with predetermined intervals, and each of the rotor slots housing a field coil, wherein:
- the cross-sectional areas of the rotor slots other than rotor slots formed at the positions nearest to the magnetic pole portions are gradually increased in the direction from the magnetic pole portions toward the interpolar portions, and
- the interval between adjacent rotor slots is increased in the direction from the magnetic pole portions toward the interpolar portions, and widths of the rotor slots are gradually increased in the direction from the magnetic pole portions toward the interpolar portions.

5. The rotating electric machine according to claim 4, wherein a cooling gas duct is formed at the inner diameter side of each of the rotor slots of the rotor core.

6. The rotating electric machine according to claim 4, wherein cooling gas ducts are formed at side surface of the rotor slots.

7. A rotating electric machine comprising:
- a stator constructed by winding armature coils around a stator core; and
- a cylindrical rotor having at least one pair of magnet pole portions and interpolar portions formed in non-polar portions between the magnetic pole portions, each of the non polar portions having at least three rotor slots formed with predetermined intervals, and each of the rotor slots housing a field coil, wherein:
- the cross-sectional areas of the rotor slots other than rotor slots formed at the positions nearest to the magnetic pole portions are gradually increased in the direction from the magnetic pole portions toward the interpolar portions, and
- the interval between adjacent rotor slots is increased in the direction from the magnetic pole portions toward the interpolar portions and widths and depths of the rotor slots are set so as to increase the cross-sectional areas of the rotor slots in the direction from the magnetic pole portions toward the interpolar portions.

8. The rotating electric machine according to claim 7, wherein a cooling gas duct is formed at the inner diameter side of each of the rotor slots of the rotor core.

9. The rotating electric machine according to claim 7, wherein cooling gas ducts are formed at side surface of the rotor slots.

* * * * *